(12) United States Patent
Subramaniam

(10) Patent No.: US 6,618,373 B1
(45) Date of Patent: Sep. 9, 2003

(54) METHOD AND SYSTEM FOR RELIABLE IN-ORDER DISTRIBUTION OF EVENTS

(75) Inventor: Mcv Subramaniam, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/438,018

(22) Filed: Nov. 10, 1999

(51) Int. Cl.[7] .......................... H04L 12/28; H04L 12/56
(52) U.S. Cl. ........................................ 370/390; 370/432
(58) Field of Search ................................. 370/390, 432, 370/389, 394, 474, 216, 241, 244, 252, 410, 522, 508

(56) References Cited

U.S. PATENT DOCUMENTS

| | | | |
|---|---|---|---|
| 5,313,454 A | 5/1994 | Bustini et al. | |
| 5,402,415 A | 3/1995 | Turner | |
| 5,673,263 A | 9/1997 | Basso et al. | 370/396 |
| 5,717,688 A | 2/1998 | Belanger et al. | |
| 5,729,680 A | 3/1998 | Belanger et al. | |
| 5,754,938 A | 5/1998 | Herz et al. | |
| 5,754,939 A | 5/1998 | Herz et al. | |
| 5,764,645 A | 6/1998 | Bernet et al. | 377/466 |
| 5,802,278 A | 9/1998 | Isfeld et al. | |
| 5,802,285 A | 9/1998 | Hirviniemi | 395/200.8 |
| 5,838,730 A | 11/1998 | Cripps | |
| 5,875,186 A | 2/1999 | Belanger et al. | |
| 5,905,871 A | 5/1999 | Buskens et al. | |
| 5,933,607 A | 8/1999 | Tate et al. | |
| 5,940,771 A | 8/1999 | Gollnick et al. | |
| 5,959,968 A | 9/1999 | Chin et al. | |
| 6,031,818 A * | 2/2000 | Lo et al. | 370/216 |
| 6,049,834 A | 4/2000 | Khabardar et al. | |
| 6,058,416 A * | 5/2000 | Mukherjee et al. | 709/203 |
| 6,078,990 A | 6/2000 | Frazier | |
| 6,081,812 A | 6/2000 | Boggs et al. | |
| 6,105,122 A | 8/2000 | Muller et al. | |
| 6,148,349 A | 11/2000 | Chow et al. | |
| 6,163,543 A | 12/2000 | Chin et al. | |
| 6,205,139 B1 * | 3/2001 | Voit | 370/389 |
| 6,247,077 B1 | 6/2001 | Muller et al. | |
| 6,256,740 B1 | 7/2001 | Muller et al. | |
| 6,269,081 B1 * | 7/2001 | Chow et al. | 370/241 |
| 6,272,127 B1 | 8/2001 | Golden et al. | |
| 6,327,254 B1 * | 12/2001 | Chuah | 370/322 |
| 6,332,163 B1 | 12/2001 | Bowman-Amuah | |
| 6,335,927 B1 | 1/2002 | Elliott et al. | |
| 6,377,548 B1 * | 4/2002 | Chuah | 370/233 |
| 6,415,312 B1 * | 7/2002 | Boivie | 709/200 |
| 6,424,659 B2 * | 7/2002 | Viswanadham et al. | 370/469 |
| 6,438,594 B1 | 8/2002 | Bowman-Amuah | |
| 6,452,915 B1 | 9/2002 | Jorgensen | |
| 6,456,597 B1 | 9/2002 | Bare | |
| 6,460,036 B1 | 10/2002 | Herz | |
| 6,473,403 B1 | 10/2002 | Bare | |
| 6,493,318 B1 | 12/2002 | Bare | |
| 6,502,140 B1 * | 12/2002 | Boivie | 709/238 |
| 6,505,253 B1 | 1/2003 | Chiu et al. | |
| 6,515,967 B1 * | 2/2003 | Wei et al. | 370/244 |

\* cited by examiner

*Primary Examiner*—Wellington Chin
*Assistant Examiner*—Jamal A. Fox
(74) *Attorney, Agent, or Firm*—Blakely, Sokoloff, Taylor & Zafman LLP

(57) ABSTRACT

A system and method for maintaining reliable in-order event distribution using multicast are described. A trigger event is sensed and a multicast payload containing a plurality of queued events and a packet sequence number in response to the trigger event is created. Further, a current multicast packet is transmitted to at least one receiving device, the current multicast packet containing the multicast payload. The multicast packet is received from the transmitting device and a transmission count of each of the plurality of queued events is examined. In addition, a plurality of current queued events of the plurality of queued events and a plurality of missed transmission queued events of the plurality of queued is processed.

68 Claims, 7 Drawing Sheets

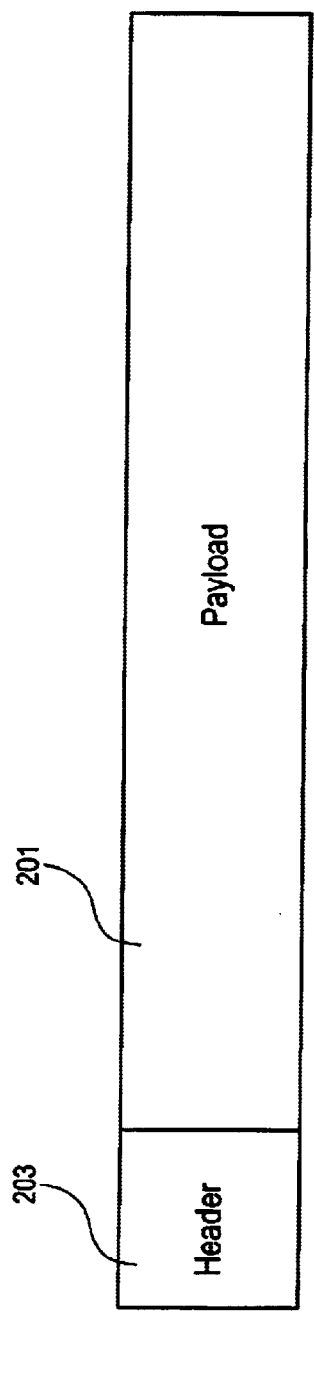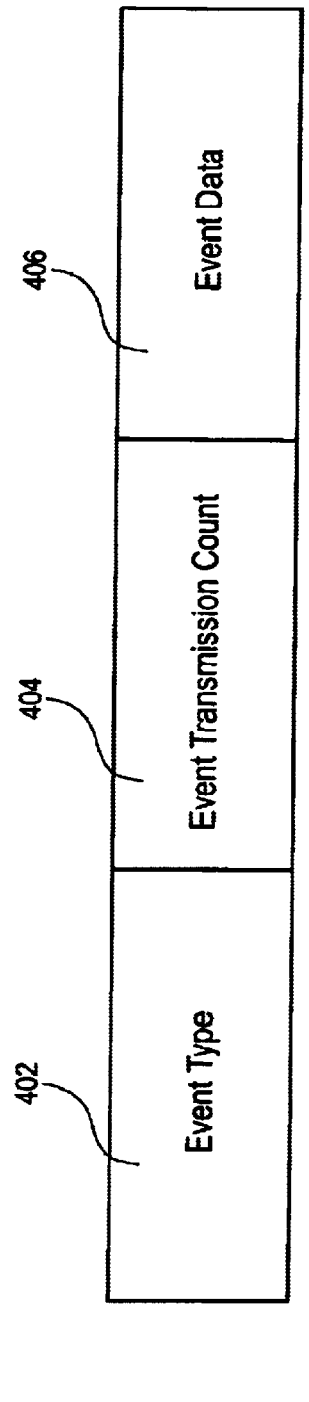

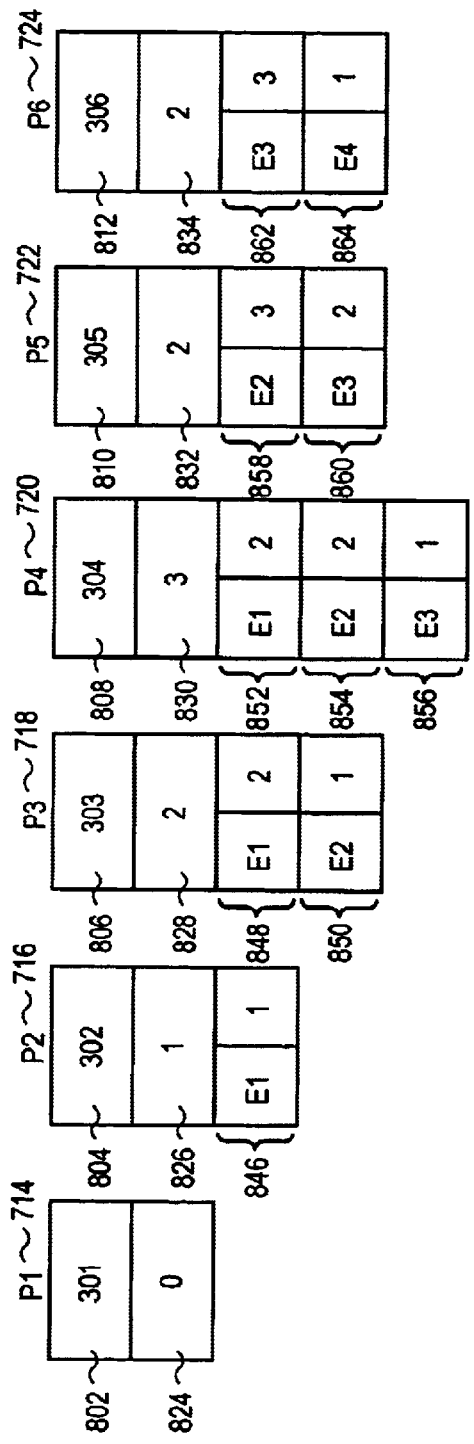
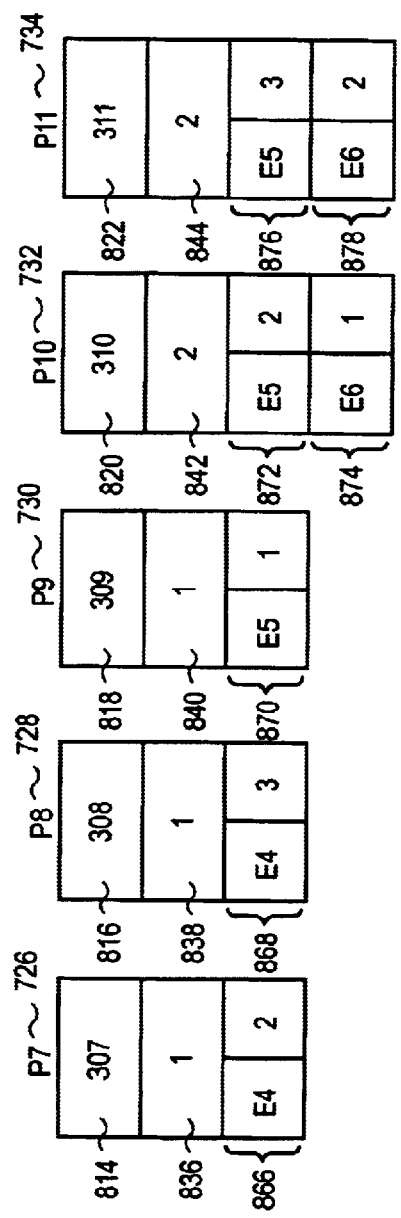
FIG. 8A FIG. 8B FIG. 8C FIG. 8D FIG. 8E FIG. 8F
FIG. 8G FIG. 8H FIG. 8I FIG. 8J FIG. 8K

METHOD AND SYSTEM FOR RELIABLE IN-ORDER DISTRIBUTION OF EVENTS

FIELD OF THE INVENTION

The present invention relates to the use of multicasting and in particular to a method and system for distributing reliable in-order events using multicast.

BACKGROUND OF THE INVENTION

Computers may be connected to form a variety of networks. Networking is generally a configuration of computers, software, and communication devices connected for information interchange. Devices connected to the network may be workstations, servers, bridges, routers, and other various devices. Typically, computer application programs use a variety of network protocols to communicate with each other over networks. Such network protocols may include, for example, asynchronous transfer mode (ATM) protocol or transmission control protocol/internet protocol (TCP/IP).

A networking system may be divided into a number of links. A link may be a local area network (LAN) with each LAN capable of supporting several computers. In addition, components of a networking system may be connected remotely to form wide area networks (WAN).

Typically, a network protocol consists of up to seven layers: a physical layer, a datalink layer, a network layer, a transport layer, a session layer, a presentation layer, and an application layer. Information packets are formed in the higher layers and are passed down through the lower layers until they reach the network layer. In the network layer, headers are added to the information packets and may include, for example, destination addresses to which the packets are to be sent. The packets are passed to the physical layer, which transmits the packets onto the bus. The system forwards the packets link-to-link until they are retrieved at their destination according to the destination address contained in the header. Depending on the protocol used, the packets may be frames or cells.

Typically, in an information processing subsystem of the networking system, multiple hardware modules are used to distribute information. One or more of these modules may be responsible for critical functions which need to be available at all times for the proper functioning of the networking system. An example of this module may be a central processing module that segments information into frames or cells and/or reassembles frames or cells into information. Typically, the information is contained within a packet payload. An example of a central processing module may be an ATM processing module. ATM uses any received information whether it be data, voice, or image, and any speed rate of the information, segments the information into predetermined fixed-length packets (i.e., payloads), and attaches a header to the individual payloads so that each payload may be sent to its destination in the networking system. In the distribution mode, the ATM central processing module processes information into cells and the cells are sent to the various distribution modules to be transmitted over the networking system. A failure of the ATM processing module generally results in the failure of the link for that portion of the networking system.

To prevent such failure, hardware modules with critical functions, termed server modules, may be supported by one or more hardware redundant modules with similar functionality. Typically, one of the modules, termed a primary server module, is chosen to actively provide the critical functions in a networking system. One or more additional modules with similar functions, termed secondary modules, are present as backup for the primary module. If the primary module fails, the secondary module detects the failure condition and takes over to become the primary module.

In distributed real time networking systems, events taking place on the network need to be delivered to all the connected modules (clients) in the system that need to be aware or use the event. Typically, there are several clients for a particular networking event. Such events may include, for example, an indication that a module has become connected to the system or is no longer connected to the system, an indication that a server is switching from primary to secondary status or from secondary to primary status, an indication that a change in a system configuration is required (for example, resetting the time of day), and an indication that a device connected to the network is partially available. In addition, in a fault tolerant network system, the networking events need to be delivered reliably and, in most cases, in the order of occurrence of the event.

In many networking systems, reliability may be achieved using the retransmission and a pair-wise unicast between a server and the clients. These systems typically use an acknowledgment routine to indicate that the transmission of the event has been sent and received properly. Further, the total number of messages to distribute an event is $2n$ (one message to each client and one acknowledgment back). The number of messages exceeds $2n$ if there is need for retransmissions (due to loss of messages). However, retransmission may not satisfy the real-time needs of event delivery. Real-time needs may be achieved using a multicast protocol. Multicast protocol or multicasting is a one-to-many transmission that provides a method for a server to send packets to a group of client modules within the networking system. By using multicasting, a single message is sufficient to transmit information (an event) to all clients. However, in order to assure reliability, the number of messages in the best case is still $n+1$ (one outbound and n return messages) in an n-client system.

In Internet Protocol Multicast (IPM), a best effort delivery service is provided. IPM assumes that all clients can handle the multicast packets being sent. However, IPM does not provide a reliable real-time system as IPM does not guarantee that all sites receive the packets and performance degrades as the number of clients grows. In addition, IPM does not guarantee that packets do not overrun slow clients. Within a multicast group, some clients may be slow to receive and process events while others are fast and the server must find an optimal transmission rate that accommodates all of the clients during a multicast transmission so that slow clients reliably receive events in-order. Further, IPM does not provide a mechanism for the detection of lost or corrupted event packets.

SUMMARY OF THE INVENTION

A method and system for maintaining reliable in-order distribution using multicast are described. A trigger event is sensed and a multicast payload containing a plurality of queued events and a packet sequence number in response to the trigger event is created. Further, a current multicast packet is transmitted to at least one receiving device, the current multicast packet containing the multicast payload. The multicast packet is received from the transmitting device and a transmission count of each of the plurality of queued events is examined. In addition, a plurality of current queued events of the plurality of queued events and a plurality of missed transmission queued events of the plurality of queued is processed.

Other features and advantages of the embodiments of the invention will be apparent from the accompanying drawings and from the detailed description that follows below.

BRIEF DESCRIPTION OF THE DRAWINGS

The present invention is illustrated by way of example, and not by way of limitation in the figures of the accompanying drawings in which like reference numerals refer to similar elements.

FIG. 2 is a block diagram of one embodiment for a multicast event packet;

FIG. 4 is a block diagram of one embodiment for an event entry of the multicast packet payload of FIG. 3;

FIGS. 8a–8k are exemplary block diagrams of multicast packet payloads corresponding to FIG. 7.

DETAILED DESCRIPTION

A system and method for maintaining reliable in-order event distribution using multicast are described. A trigger event is sensed and a multicast payload containing a plurality of queued events and a packet sequence number in response to the trigger event is created. Further, a current multicast packet is transmitted to at least one receiving device, the current multicast packet containing the multicast payload. The multicast packet is received from the transmitting device and a transmission count of each of the plurality of queued events is examined. In addition, a plurality of current queued events of the plurality of queued events and a plurality of missed transmission queued events of the plurality of queued is processed. Although discussed in terms of an Asynchronous Transfer Mode (ATM) network protocol, the embodiments may be used in any suitable network that supports multicasting.

Some portions of the detailed descriptions that follow are presented in terms of algorithms and symbolic representations of operations on data bits within a computer memory in the form of a computer program. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Figure 1:
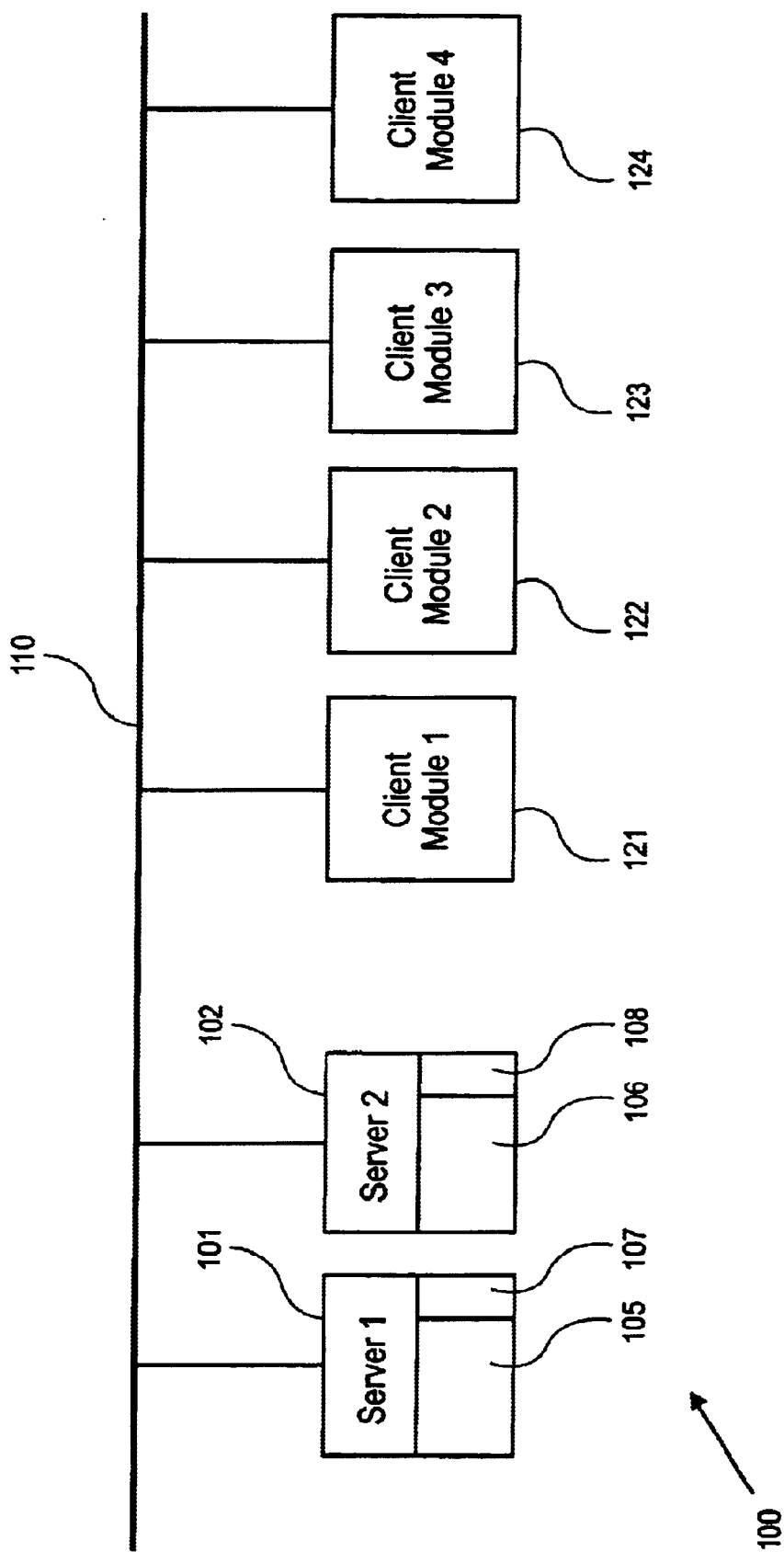
FIG. 1 is a block diagram of one embodiment for a multicast system.

FIG. 1 is a block diagram of one embodiment for a multicast system 100. Referring to FIG. 1, system 100 includes a plurality of servers 101, 102 that are capable of providing critical functions within a networking system and may be coupled to a bus 110. Servers 101, 102 each contain an event distributor 105, 106. Event distributor 105 is responsible for sensing, transmitting, and receiving network events within system 100. Server 101 segments information into packets for distribution within the networking system and/or reassembles packets into information to be used by a destination computer. Event distributor 105 assembles network events for transmission. The assembled events are passed to a link layer within server 101 protocol for encapsulation within, for example, an ATM protocol packet. Server 101 segments and transmits the packets over the system 100 via a multicast protocol. For one embodiment, IP multicast may be used. For alternate embodiments, any multicast protocol may be used. For alternate embodiments, packets may be "frames" or "cells" which may be used in integrated services digital network (ISDN) protocol. While a plurality of servers 101, 102 may be coupled to the bus 110, only one server 101 may be active at any one time to segment and/or reassemble packets. The remaining server 102 may be a redundant module that is used as a standby server of primary server 101.

Servers 101, 102 may further include multicast event queues 107, 108 that contain networking events that have occurred within system 100 and that need to be transmitted within system 100. Further coupled to the bus 110 are a plurality of clients 121, 122, 123, 124. Clients 121, 122, 123, 124 may be serial data modules (SDMs) that may receive packets from the primary server 101 to transmit into the networking system. Additionally, the SDMs may receive packets from the networking system to transmit to primary server 101.

Serve 101, 102, and clients 121, 122, 123, 124 may be contained within a chassis and connected together by a backplane. For one embodiment, one of the clients may also reside in the same hardware as the server. Within the backplane may be a plurality of slots in which the various modules may be connected. Each slot has an assigned physical address that may be used by the connected module. The physical address of the slot identifies the location of the connected module and, thus, the physical address may be used in a header of a packet that is destined for the module. For example, in the case of an ATM-like cellbus backplane, cells are sent from one module to another using logical channels identified by virtual path/virtual circuit (VP/VC) addresses. These addresses are used by the cellbus interface hardware lookup tables to retrieve the proper cellheader that contains the physical address of the destination module. Generally, a lookup table contains a mapping of VP/VC addresses of the logical channels to the physical addresses of the various modules. The lookup table may be used by a module to look up an address of the destination module.

Only one server 101, 102 may be active at any one time. For redundancy purposes, many methods may be used for providing communication between a primary server 101 and a standby server 102. Primary server 101 may, at fixed intervals, send event packets via bus 110 to standby server 102 to indicate that the primary server 101 is functioning. If standby server 102 does not receive a packet from primary server 101 within a predetermined period of time, standby server 102 activates to become the new primary server. Once activated, the new primary server takes over the functions of the previous primary server and begins to send packets at fixed intervals to another standby server to indicate that it is functioning.

Clients 121, 122, 123, 124 receive multicast event packets from primary server 101 in order to transmit the event packets within the networking system or to process the events. Additionally, clients 121, 122, 123, 124 may receive packets from the networking system and transmit the packets to primary server 101. Clients 121, 122, 123, 124 may identify the location of the primary server 101 by using a lookup table which contains the physical address of primary server 101. If primary server 101 has failed, and the role is assumed by standby server 102, clients 121, 122, 123, 124 need to detect the changeover of the active server so that communication may be established with the new active server.

FIG. 2 is a block diagram of one embodiment for a multicast event packet 200. Referring to FIG. 2, multicast event packet 200 includes payload 201 containing a quantified piece of information and a header 203 which includes a multicast address field. A multicast address identifies a collection of all clients in the system. For example, a multicast address may identify clients 121, 122, 123 or 124.

Figure 3:
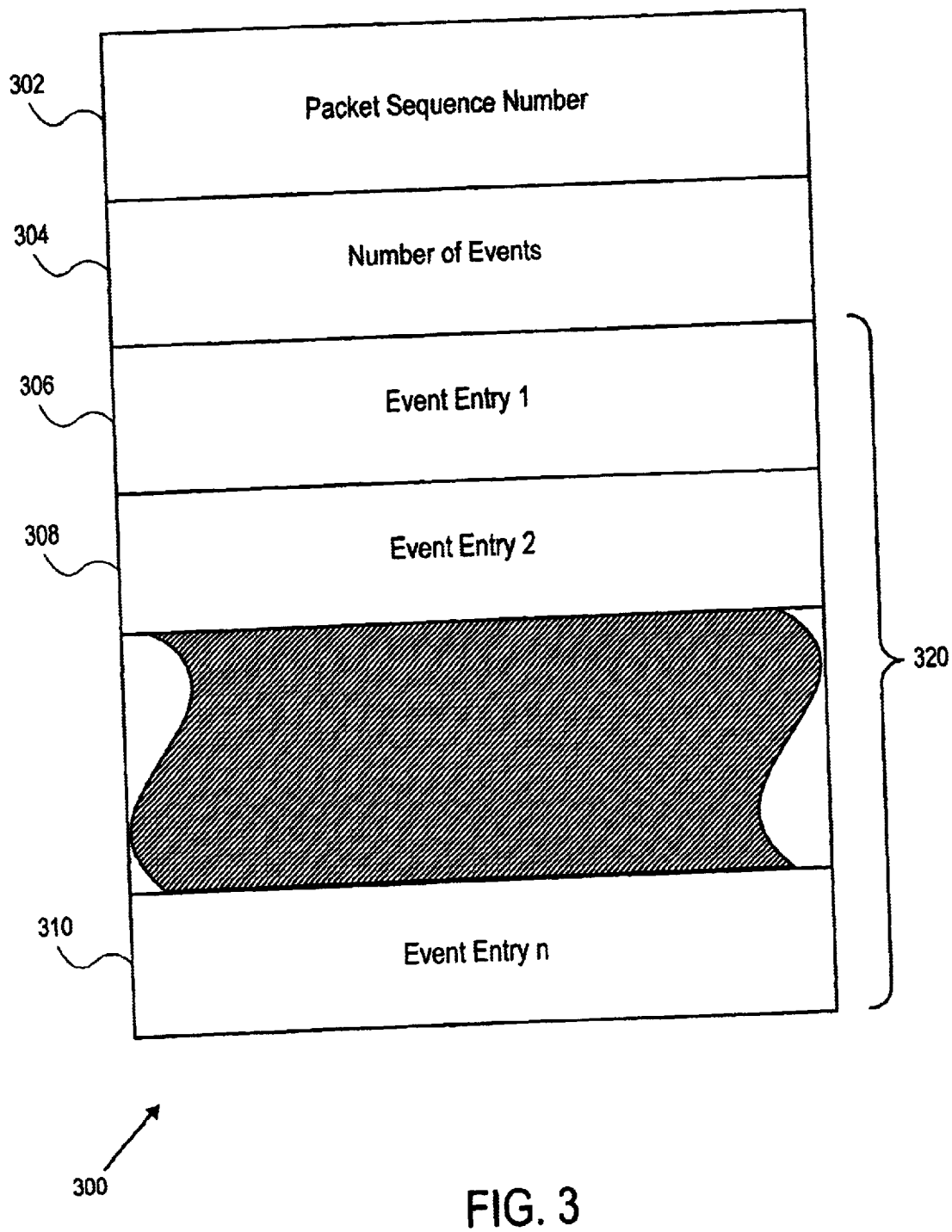
FIG. 3 is a block diagram of one embodiment for a multicast packet payload.

FIG. 3 is a block diagram of one embodiment for multicast event 300. Referring to FIG. 3, multicast event 300 includes packet sequence number 302, number of events 304, and from 1 (306) to n (310) event entries 320 (e.g., including event entry 308). Each multicast event 300 contains a unique packet sequence number 302. Each packet sequence number 302 is incremented by one for each packet sent over the network. Event distributor 105 loads the number of event entries 320 into number of events 304. Event distributor 105 loads all events queued for transmission from multicast event queue 107 into multicast event 300. The events are loaded in the order of occurrence. Thus, in this embodiment, the oldest event is placed in event entry 1 (306) and the most recent event is placed in event entry n (310). If no events are queued in event queue 107, event distributor 105 loads the value zero in number of events 304 and no event entries 320 are loaded. Multicast event 300 is then loaded into payload 201 by server 101 for transmission to clients 121–124.

For one embodiment, payload 201 may contain the entire multicast event data 300. For alternate embodiments, multiple payloads 201 may be required to contain event data 300 and multiple event packet 200 may be used to transmit the multicast event information.

FIG. 4 is a block diagram of one embodiment for an event entry 320. Referring to FIG. 4, event entry 320 includes event type 402, event transmission count 404, and event data 406. Event type 402 indicates the type of information being sent by server 101. Such events include, for example, a card unavailable event which indicates that a client 121–124 is unavailable or a connection has been lost, a card ready event that indicates that a client 121–124 is available, or a platform event which indicates that a card is available but only for certain activities or that a redundancy has been added either to a client 121–124 or to a server 101, 102.

Event transmission count 404 includes the number of times that a multicast event has been transmitted. For one embodiment, a maximum transmission count of 3 is used. Thus, in this embodiment, a multicast event would be transmitted from 1 to 3 times. For an alternate embodiment, any value for the maximum transmission count may be used. After the third transmission, the multicast event is dropped from event queue 107 and only re-transmitted if a client 121–124 indicates that an error has occurred and needs a retransmission of the multicast event. For an alternate embodiment, client 121–124 is dropped if it logs an error to the event distributor 105. As the maximum event transmission count is increased, the bandwidth used increases; however, the reliability of transmission and receipt is increased. A higher value for the maximum transmission count may be used, for example, to minimize "blips" in audio or video transmissions. Event data 406 contains the actual event information for implementing the event.

For an alternate embodiment, all clients 121–124 may acknowledge receipt of a multicast event and that particular event may be dropped from event queue 107 and not retransmitted by server 101.

Figure 5:
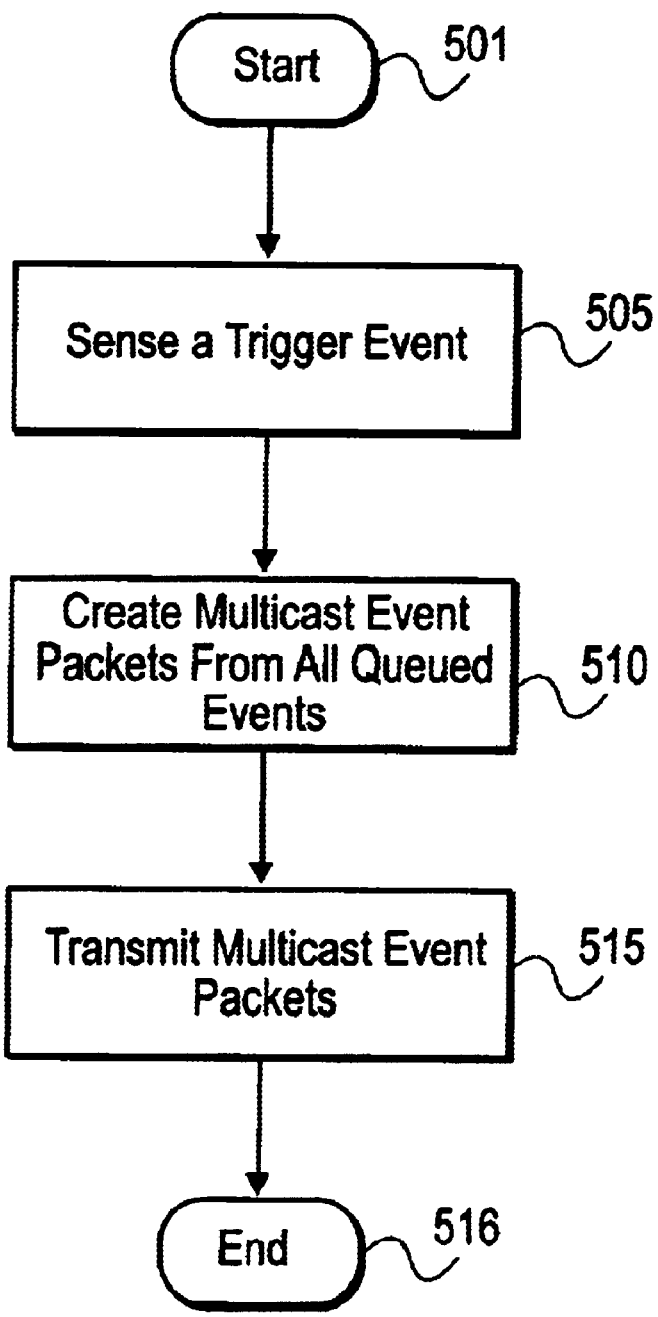
FIG. 5 is a flow diagram of one embodiment for transmitting multicast event packets.

FIG. 5 is a flow diagram of one embodiment for transmitting multicast event data 300. The flow diagram of FIG. 5 has a Start 501 and an End 516. Initially at processing block 505, a trigger event is sensed. A trigger event may be a change in the status of an attached client 121–124, a change in the status of the primary and secondary servers 101, 102, or a change in system 100 configuration. For an alternate embodiment, the triggering event may be a set time interval (e.g., a heartbeat). For one embodiment, all multicast events are transmitted at set time intervals only. For alternate embodiments, multicast packets 200 may be transmitted as soon as the events occur. In this embodiment, the timing interval is reset after the packet 200 is transmitted.

At processing block 510, multicast event data 300 is created from the events queued within multicast event queue 107. If no events are queued, the multicast packet includes packet sequence number 302 and number of events 304 which is set to 0. If any events are queued within multicast event queue 107, the events are placed in event entries 320 in-order. The oldest event is placed in event entry 1 (306) and the most recent event is placed in event entry n (310). For alternate embodiments, any in-order organization of the data may be used. Whenever an event is raised, event distributor 105 transmits all the events that are queued in event queue 107. The packet sequence number 302 is initially set to one when server 101 is initiated. When an event occurs, the event transmission count 404 for that event is initially set to one. Event transmission count 404 is incremented by one each time the event is transmitted. A multicast event is transmitted a maximum transmission count number of times. For one embodiment the maximum transmission count is set to 3. For alternate embodiments, any suitable maximum transmission count may be used. After the event has been transmitted the maximum transmission count times, the event is dropped from queue 107. At processing block 515, the multicast event packet is transmitted on bus 110.

Multicast event data 300 is transmitted on a set time interval (heartbeat). For one embodiment, the timer is set to a one second value to transmit the multicast event data 300. For alternate embodiments, any appropriate time interval may be used. For one embodiment, the timer is reset whenever an event occurs and is transmitted. In this embodiment, multicast event data 300 is transmitted immediately after the occurrence of the event. When event distributor 105 senses an event, event distributor 105 creates multicast event data 300 from the event queue 107 and immediately transmits the multicast event data 300. Once the multicast event data 300 is transmitted, the timer is reset. Thus, the next multicast event packet 200 would be sent after the set time interval has elapsed unless another event occurs at which time the event data 300 would be created and immediately sent. For an alternate embodiment, the multicast event data 300 is not transmitted until the heartbeat interval has been reached.

Figure 6:
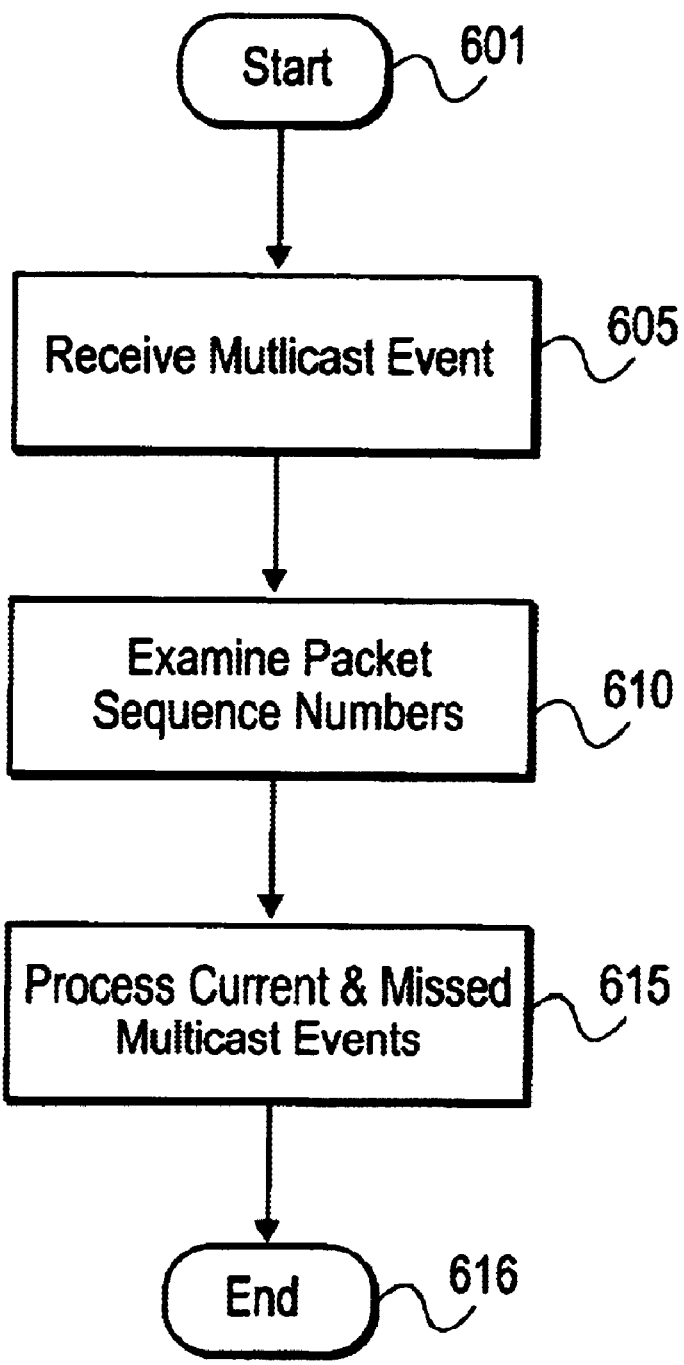
FIG. 6 is a flow diagram of one embodiment for receiving multicast event packets.

FIG. 6 is a flow diagram of one embodiment for receiving multicast event data 300. The flow diagram of FIG. 6 has a Start 601 and an End 616. Initially at processing block 605, client 121 receives the multicast event data 300. Multicast event data 300 are transferred to programs within client 121 via the datalink layer of the protocol maintained within client 121.

At processing block 610, packet sequence number 302 is examined. If packet sequence number 302 indicates that client 121 has missed more than the maximum transmission count of multicast event 300, client 121 logs an error with event distributor 105 to resend and reset the card and continue processing all unseen events in the multicast event 300. Event distributor 105 may, for one embodiment, reset the client. In an alternate embodiment, event distributor 105 may maintain a history of events transmitted, and may reset the client only if the history indicates that the client has missed events (unseen events will be all those having event transmission count 404 of 3 or less). For an alternate embodiment, client 121 may be dropped from system 100 if it logs an error. If client 121 has not missed more than the maximum transmission count of multicast event data 300 or has missed no data 300, client 121 will process current and missed transmission events at processing block 615.

At processing block 615, if client 121 has missed no transmitted multicast event data 300 based upon packet sequence number 302, client 121 processes event entries 320 in which the event transmission count 404 is a 1, indicating that the event 320 is the first time for the transmission of the event. If client 121 has missed one multicast event data 300 (based upon packet sequence number 302), client 121 processes events 320 in which event transmission count 404 is 1 or 2.

If client 121 has missed two multicast event data 300 (based upon packet sequence number 302), client 121 processes events 320 with event transmission counts 404 of 1, 2 or 3. This process continues as long as the event transmission count 404 is less than or equal to the maximum transmission count set for system 100, client 121 has not missed more than the maximum transmission count of multicast event data 300, and the maximum number of heartbeats has not been exceeded. If these three conditions are met and client 121 has missed multicast event data 300, client 121 processes all events that have event transmission counts 404 less than or equal to the difference between a current packet sequence number 302 and the packet sequence number 302 of the last multicast event data 300 received. The maximum transmission count may be set at any applicable number. For one embodiment, the maximum transmission count is set to 3. Thus, in this embodiment if client 121 has missed two multicast event data 300, client 121 processes any events 320 with an event transmission count 404 of 3 or less.

If client 121 has not received a multicast event data 300 for more than three time intervals or heartbeats (e.g., 3 seconds), client 121 logs an error with event distributor 105 and awaits event distributor 105 to correct the error. For one embodiment, event distributor 105 retransmits any lost multicast event data 300. For an alternate embodiment, if client module 121 reports an error, event distributor 105 removes client 121 from the network. For one embodiment, if client 121 logs an error that it has missed the three or more transmissions and event distributor 105 finds it has not sent any events 320, event distributor 105 will not reset client 121 and let client 121 continue.

The transmission of multicast event data 300 is initiated once event distributor 105 senses the state of all clients 121–124 or cards in system 100. The initial start-up message sent to event distributor 105 during event distributor 105 start-up (or during switchover between server 101 to server 102), contains the starting packet sequence number 302 used by the protocol. The initial start-up message sent to clients 121–124 once server 101 takes over or powers up resets packet sequence number 302. Upon receiving this initiation message, client 121 must clear all outstanding errors concerning multicast event messages not received by client 121 within the time period. However, client 121 does not clear the other non-fatal and fatal errors reported by applications.

Figure 7:
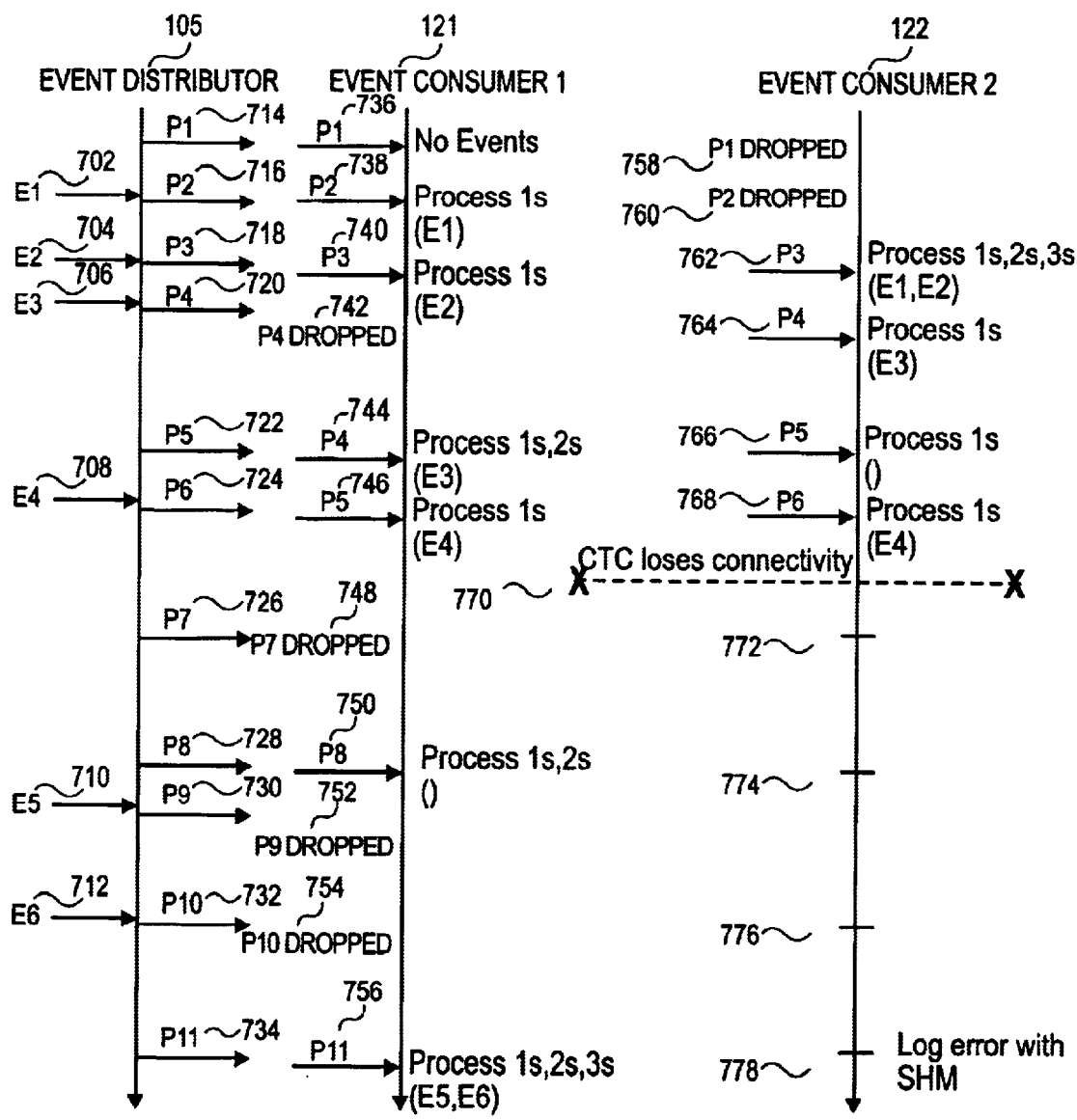
FIG. 7 is an exemplary diagram illustrating the transmitting and receiving of multicast event packets.

FIG. 7 is an exemplary diagram illustrating the transmission and receiving of multicast event data 300. FIGS. 8A–8K are exemplary block diagrams of multicast packet payloads 300 corresponding to FIG. 7. For this discussion, reference will be made to FIGS. 7 and 8A–8K together. Packets P1 (714), P2 (716), P3 (718), P4 (720), P5 (722), P6 (724), P7 (726), P8 (728), P9 (730), P10 (732), and P11 (734) include packet sequence numbers 802, 804, 806, 808, 810, 812, 814, 816, 818, 820 and 822, respectively, and number of events numbers 824, 826, 828, 830, 832, 834, 836, 838, 840, 842 and 844, respectively. Reference numerals 846, 848, 850, 852, 854, 856, 858, 860, 862, 864, 866, 868, 870, 872, 874, 876 and 878 designate event entries. Initially, event distributor 105 senses or initiates an initial event data at P1 (714). Referring to FIG. 8a, this initial event data 300 is an initiation in which the packet sequence number 802 is set to an initial number and the number of events 824 is set to 0. In the FIG. 7 example, this packet is sent to client 121 and client 122. Clients 121 and 122 are event consumers or receiving devices. Client 121 receives the P1 packet at 736. Because the packet contains no events, no processing is required. Client 122 does not receive P1 (758).

At event E1 (702), event distributor 105 senses the event and prepares the appropriate multicast event data 300 as shown in FIG. 8b. Packet sequence number 804 is incremented and the E1 event information is loaded into event entry 846. The number of events 826 is set to 1. Because this is the first time E1 (702) is to be transmitted, event distributor 105 logs the event transmission count 404 as 1 as shown at 846. P2 (716) is transmitted both to client 121 and client 122. Client 121 receives P2 at 738; however, client 122 drops or does not receive P2 at 760.

Event E2 (704) is sensed by event distributor 105 and the appropriate multicast event data 300 is created, as shown in FIG. 8C. Multicast event data 300 is transmitted to clients 121 and 122. Client 122 receives the data at 762. Because client 122 missed the two prior multicast event packets 300, client 122 processes both events E1 (702) and E2 (704). Client 122 processes all events with event transmission count 404 of 1 or 2.

Processing continues in the same manner for P4 (720) as shown in FIG. 8D, P5 (722) as shown in FIG. 8E and P6 (724) as shown in FIG. 8F. P5 (722) is transmitted at the set time interval (heartbeat) as no events have occurred between the transmission of P4 (720) and P5 (722). For one embodiment, because P4 (720) has occurred prior to the expiration of a set time interval, P6 (724) is transmitted immediately upon the sensing of event E4 (708).

P7 (726), as shown in FIG. 8G, is created and transmitted after the set time interval (heartbeat) has elapsed as no intervening event has occurred between P6 (724) and P7 (726). In the FIG. 7 example, client 122 loses connectivity to event distributor 105 at 770. In addition, in the FIG. 7 example, client 121 drops or does not receive P7 (748). After the set time interval (heartbeat), P8 (728), as shown in FIG. 8H, is transmitted to both client 121 and client 122. Client 121 receives and processes P8 (728) at 750. Because client 121 did not process P7 (726), client 121 processes any events included in P8 (728) with event transmission count 404 of 1 or 2. However, in the FIG. 7 and FIG. 8G–8H examples, P7 (726) and P8 (728) contain only one event 320.

Thus, upon receipt of P8 (728), client 121 does not process event E4 (868) as it will only process events with transmission count 404 of 1 or 2 and event E4 (868) has a transmission event 404 of 3. This prevents client 121 from reprocessing an event that it already processed (at 746) and maintains the in-order reliability of the network.

Events E5 (710) and E6 (712) are sensed by event distributor 105 in the appropriate event data P9 (730) (as shown in FIG. 8I) and P10 (732) (as shown in FIG. 8J) are compiled and transmitted. Client 121 drops both P9 (730) and P10 (732) as shown at 752 and 754. Client 122 does not receive either event data 300 as connectivity was lost at 770. Thus, client 122 does not receive any event data 300 at 772, 774, or 776. Because client 122 has not received multicast event data 300 for over the maximum time interval (in this example, three seconds), client 122 logs an error with event distributor 105 at 778. For one embodiment, event distributor 105 removes client 122 from further processing. For an alternate embodiment, event distributor 105 retransmits all missed events to client 122 if connectivity can be reestablished.

Event distributor 105 transmits event data P11 (734), as shown in FIG. 8K, to client 121 and other client modules within the system. Client 121 processes P11 (734) as shown at 756. As client 121 has missed two prior transmissions, client 121 processes all events contained with event data P11 (734) (FIG. 8K) with client transmission count 404 of 1, 2 or 3. In the example, client 121 processes events E5 (876) and E6 (878).

For one embodiment, after client 121 receives event data 300, no acknowledgement is required. In this embodiment, client 121 only reports an error to event distributor 105 if client 121 does not receive a packet for more than the maximum transmission count (or the maximum number of heartbeats). Thus, in the FIGS. 7 and 8A–8K examples, clients 121 and 122 do not acknowledge the receipt of individual event data 300. Event distributor 105 only receives a message from client 122 at 778 once client 122 has not received multicast event data 300 for more than three time intervals. For an alternate embodiment, clients 121 and 122 acknowledge receipt of each event data 300.

The embodiments described above provide a balance between real-time needs and reliability depending upon the network bandwidth available. By setting the time interval between transmissions to be small, real-time delivery may be improved. On the other hand, setting the maximum re-transmits to be large, reliability may be improved. Setting the time interval small and maximum re-transmits large will require increased network bandwidth. In addition, setting the time interval small will result in an increase in processor workload.

In the foregoing specification, the invention has been described with reference to specific exemplary embodiments thereof. It will, however, be evident that various modifications and changes may be made thereto without departing from the broader sprit and scope of the invention as set forth in the appended claims. The specification and drawings are, accordingly, to be regarded in an illustrative rather than a restrictive sense.

What is claimed is:

1. A method for reliable in-order distribution of events, the method comprising:

sensing a trigger event;

creating a multicast payload containing a plurality of queued events and a packet sequence number in response to the trigger event; and transmitting at least one multicast packet to at least one receiving device, the at least one multicast packet containing the multicast payload.

2. The method of claim 1 further comprising:

generating a trigger event if a network event is raised.

3. The method of claim 1 further comprising:

generating a trigger event at a set time interval.

4. The method of claim 1 further comprising:

if a set time interval has elapsed,
transmitting the at least one multicast packet; and if a network event is raised,
transmitting the at least one multicast packet, and resetting a time interval.

5. The method of claim 1 further comprising:

transmitting the at least one multicast packet at a set time interval.

6. The method of claim 1 further comprising:

incrementing a transmission count for each of the plurality of queued events for each transmission of each of the plurality of queued events.

7. The method of claim 1 wherein a queued event is transmitted a maximum transmission count times.

8. The method of claim 1 further comprising:

if a queued event of the plurality of queued events has been transmitted a maximum transmission count times, discarding the queued event.

9. The method of claim 1 further comprising:

generating an event entry in response to the trigger event.

10. The method of claim 9 wherein the event entry includes an event type, an event transmission count, and event data.

11. The method of claim 1 wherein the queued events are placed into the multicast payload in order of occurrence.

12. A method of receiving reliable in-order event distribution using multicast, the method comprising:

receiving a plurality of multicast packets, wherein each of the plurality of multicast packets contain a plurality of queued events and a packet sequence number, examining a transmission count of each of the plurality of queued events; and processing a plurality of current queued events of the plurality of queued events and a plurality of missed transmission queued events of the plurality of queued events.

13. The method of claim 12 further comprising:

if the transmission count is greater than a maximum transmission count, reporting to a transmitting device.

14. The method of claim 12 further comprising:

if a maximum time interval has elapsed without receiving at least one multicast packet, reporting to a transmitting device.

15. The method of claim 12 further comprising:

if each multicast packet of the plurality of multicast packets have been received based upon the packet sequence number,
processing all queued events with a transmission count of 1.

16. The method of claim 12 further comprising:

if the event transmission count is less than or equal to a maximum transmission count, no more than the maximum transmission count of the plurality of multicast packets have not been received, and a maximum transmission interval has not been exceed,
processing each queued event of the plurality of queued events wherein the event transmission count of the event is less than or equal to the difference between a current packet sequence number less a last received packet sequence number.

17. A method of maintaining reliable in-order event distribution using multicast, the method comprising:
   sensing a trigger event;
   creating a multicast payload containing a plurality of queued events and a packet sequence number in response to the trigger event;
   transmitting a current multicast packet to at least one receiving device, the current multicast packet containing the multicast payload;
   receiving the current multicast packet from a transmitting device;
   examining a transmission count of each of the plurality of queued events; and
   processing a plurality of current queued events of the plurality of queued events and a plurality of missed transmission queued events of the plurality of queued.

18. The method of claim 17 further comprising:
   generating a trigger event if a network event is raised.

19. The method of claim 17 further comprising:
   generating a trigger event at a set time interval.

20. The method of claim 17 further comprising:
   if a set time interval has elapsed,
      transmitting the current multicast packet; and
   if a network event is raised,
      transmitting the current multicast packet, and resetting a time interval.

21. The method of claim 17 further comprising:
   transmitting the current multicast packet at a set time interval.

22. The method of claim 17 further comprising:
   incrementing a transmission count for each of the plurality of queued events for each transmission of each of the plurality of queued events.

23. The method of claim 17 wherein a queued event is transmitted a maximum transmission count times.

24. The method of claim 17 further comprising:
   if a queued event of the plurality of queued events has been transmitted a maximum transmission count times, discarding the queued event.

25. The method of claim 17 further comprising:
   generating an event entry in response to the trigger event.

26. The method of claim 25 wherein the event entry includes an event type, an event transmission count, and event data.

27. The method of claim 17 wherein the queued events are placed into the multicast payload in order of occurrence.

28. The method of claim 17 further comprising:
   if the transmission count is greater than a maximum transmission count, reporting to a transmitting device.

29. The method of claim 17 further comprising:
   if a maximum time interval has elapsed without receiving at least one multicast packet, reporting to a transmitting device.

30. The method of claim 17 further comprising:
   if all multicast packets of a plurality of multicast packets have been received based upon the packet sequence number of the current multicast packet,
      processing all queued events with a transmission count of 1.

31. The method of claim 17 further comprising:
   if the event transmission count is less than or equal to a maximum transmission count, no more than the maximum transmission count of a plurality of multicast packets have not been received, and a maximum transmission interval has not been exceed,
      processing each queued event of the plurality of queued events, wherein the event transmission count of the each queued event is less than or equal to the difference between a current packet sequence number less a last received packet sequence number.

32. A system of sending reliable in-order event distribution using multicast, the system comprising:
   means for sensing a trigger event;
   means for creating a multicast payload containing a plurality of queued events and a packet sequence number in response to the trigger event; and
   means for transmitting at least one multicast packet to at least one receiving device, the at least one multicast packet containing the multicast payload.

33. A system for receiving reliable in-order event distribution using multicast, the system comprising:
   means for receiving a plurality of multicast packets, wherein each of the plurality of multicast packets contain a plurality of queued events and a packet sequence number,
   means for examining a transmission count of each of the plurality of queued events; and
   means for processing a plurality of current queued events of the plurality of queued events and a plurality of missed transmission queued events of the plurality of queued events.

34. A system for maintaining reliable in-order event distribution using multicast, the system comprising:
   means for sensing a trigger event;
   means for creating a multicast payload containing a plurality of queued events and a packet sequence number in response to the trigger event;
   means for transmitting a current multicast packet to at least one receiving device, the current multicast packet containing the multicast payload;
   means for receiving the current multicast packet from a transmitting device;
   means for examining a transmission count of each of the plurality of queued events; and
   means for processing a plurality of current queued events of the plurality of queued events and a plurality of missed transmission queued events of the plurality of queued.

35. A computer readable medium comprising instructions, which when executed on a processor, perform a method for sending reliable in-order event distribution using multicast, comprising:
   sensing a trigger event;
   creating a multicast payload containing a plurality of queued events and a packet sequence number in response to the trigger event; and
   transmitting at least one multicast packet to at least one receiving device, the at least one multicast packet containing the multicast payload.

36. A computer readable medium comprising instructions, which when executed on a processor, perform a method for receiving reliable in-order event distribution using multicast, comprising:
   receiving a plurality of multicast packets, wherein each of the plurality of multicast packets contain a plurality of queued events and a packet sequence number,
   examining a transmission count of each of the plurality of queued events; and
   processing a plurality of current queued events of the plurality of queued events and a plurality of missed transmission queued events of the plurality of queued events.

37. A computer readable medium comprising instructions, which when executed on a processor, perform a method for maintaining reliable in-order event distribution using multicast, comprising:

sensing a trigger event;

creating a multicast payload containing a plurality of queued events and a packet sequence number in response to the trigger event;

transmitting a current multicast packet to at least one receiving device, the current multicast packet containing the multicast payload;

receiving the current multicast packet from a transmitting device; examining a transmission count of each of the plurality of queued events; and processing a plurality of current queued events of the plurality of queued events and a plurality of missed transmission queued events of the plurality of queued.

38. A system for sending reliable in-order event distribution using multicast, comprising:

an event distributor configured to sense a trigger event, configured to create a multicast payload containing a plurality of queued events and a packet sequence number in response to the trigger event, and configured to transmit at least one multicast packet to at least one receiving device, the at least one multicast packet containing the multicast payload.

39. The system of claim 38 wherein the event distributor is further configured to generate a trigger event if a network event is raised.

40. The system of claim 38 wherein the event distributor is further configured to generate a trigger event at a set time interval.

41. The system of claim 38 wherein the event distributor is further configured to transmit the at least one multicast packet if a set time interval has elapsed, and if a network event is raised, the server is further configured to transmit the at least one multicast packet, and reset a time interval.

42. The system of claim 38 wherein the event distributor is further configured to transmit the at least one multicast packet at a set time interval.

43. The system of claim 38 wherein the event distributor is further configured to increment a transmission count for each of the plurality of queued events for each transmission of each of the plurality of queued events.

44. The system of claim 38 wherein a queued event is transmitted a maximum transmission count times.

45. The system of claim 38 further comprising:

if a queued event of the plurality of queued events has been transmitted a maximum transmission count times, the event distributor is configured to discard the queued event.

46. The system of claim 38 wherein the event distributor is further configured to generate an event entry in response to the trigger event.

47. The system of claim 46 wherein the event entry includes an event type, an event transmission count, and event data.

48. The system of claim 38 wherein the queued events are placed into the multicast payload in order of occurrence.

49. A system for receiving reliable in-order event distribution using multicast, comprising:

at least one receiving module configured to receive a plurality of multicast packets, wherein each of the plurality of multicast packets contain a plurality of queued events and a packet sequence number, configured to examine a transmission count of each of the plurality of queued events, and configured to process a plurality of current queued events of the plurality of queued events and a plurality of missed transmission queued events of the plurality of queued events.

50. The system of claim 49 further comprising:

if the transmission count is greater than a maximum transmission count, the at least one receiving device is configured to report to a transmitting device.

51. The system of claim 49 further comprising:

if a maximum time interval has elapsed without receiving at least one multicast packet, the at least one receiving device is configured to report to a transmitting device.

52. The system of claim 49 further comprising:

if each multicast packet of the plurality of multicast packets have been received based upon the packet sequence number, the at least one receiving device is configured to process all queued events with a transmission count of 1.

53. The system of claim 49 further comprising:

if the event transmission count is less than or equal to a maximum transmission count, no more than the maximum transmission count of the plurality of multicast packets have not been received, and a maximum transmission interval has not been exceed, the at least one receiving device is configured to process each queued event of the plurality of queued events wherein the event transmission count of the event is less than or equal to the difference between a current packet sequence number less a last received packet sequence number.

54. A system for maintaining reliable in-order event distribution using multicast, comprising:

an event distributor configured to sense a trigger event, configured to create a multicast payload containing a plurality of queued events and a packet sequence number in response to the trigger event, and configured to transmit a current multicast packet, the current multicast packet containing the multicast payload; and at least one receiving device configured to receive the current multicast packet from a transmitting device, configured to examine a transmission count of each of the plurality of queued events, and configured to process a plurality of current queued events of the plurality of queued events and a plurality of missed transmission queued events of the plurality of queued.

55. The system of claim 54 wherein the event distributor is further configured to generate a trigger event if a network event is raised.

56. The system of claim 54 wherein the event distributor is further configured to generate a trigger event at a set time interval.

57. The system of claim 54 further comprising:

if a set time interval has elapsed, the event distributor is configured to transmit the current multicast packet; and if a network event is raised, the event distributor is configured to transmit the current multicast packet, and the event distributor is configured to reset a time interval.

58. The system of claim 54 wherein the event distributor is further configured to transmit the current multicast packet at a set time interval.

59. The system of claim 54 wherein the event distributor is further configured to increment a transmission count for each of the plurality of queued events for each transmission of each of the plurality of queued events.

60. The system of claim 54 wherein a queued event is transmitted a maximum transmission count times.

61. The system of claim 54 further comprising:

if a queued event of the plurality of queued events has been transmitted a maximum transmission count times, the event distributor is further configured to discard the queued event.

62. The system of claim 54 wherein the event distributor is further configured to generate an event entry in response to the trigger event.

63. The system of claim 62 wherein the event entry includes an event type, an event transmission count, and event data.

64. The system of claim 54 wherein the queued events are placed into the multicast payload in order of occurrence.

65. The system of claim 54 further comprising:

if the transmission count is greater than a maximum transmission count, the receiving device is further configured to report to a transmitting device.

66. The system of claim 54 further comprising:

if a maximum time interval has elapsed without receiving at least one multicast packet, the receiving device is further configured to report to a transmitting device.

67. The system of claim 54 further comprising:

if all multicast packets of a plurality of multicast packets have been received based upon the packet sequence number of the current multicast packet, the receiving device is further configured to process all queued events with a transmission count of 1.

68. The system of claim 54 further comprising:

if the event transmission count is less than or equal to a maximum transmission count, no more than the maximum transmission count of a plurality of multicast packets have not been received, and a maximum transmission interval has not been exceed, the receiving device is further configured to process each queued event of the plurality of queued events, wherein the event transmission count of the each queued event is less than or equal to the difference between a current packet sequence number less a last received packet sequence number.

* * * * *